(12) United States Patent
Song et al.

(10) Patent No.: US 11,647,100 B2
(45) Date of Patent: May 9, 2023

(54) RESOURCE QUERY METHOD AND APPARATUS, DEVICE, AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Yue Song, Beijing (CN); Xu Chen, Beijing (CN)

(73) Assignees: CHINA MOBILE COMMUNICATION CO., LTD RESEARCH INST, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 0 days.

(21) Appl. No.: 17/280,982

(22) PCT Filed: Sep. 29, 2019

(86) PCT No.: PCT/CN2019/109189
§ 371 (c)(1),
(2) Date: Mar. 29, 2021

(87) PCT Pub. No.: WO2020/063984
PCT Pub. Date: Apr. 2, 2020

(65) Prior Publication Data
US 2021/0360084 A1 Nov. 18, 2021

(30) Foreign Application Priority Data
Sep. 30, 2018 (CN) .......................... 201811154753.2

(51) Int. Cl.
*G06F 15/173* (2006.01)
*H04L 67/60* (2022.01)
*H04L 67/02* (2022.01)

(52) U.S. Cl.
CPC .............. *H04L 67/60* (2022.05); *H04L 67/02* (2013.01)

(58) Field of Classification Search
CPC ................................ H04L 67/32; H04L 67/02
(Continued)

(56) References Cited

U.S. PATENT DOCUMENTS

| 8,650,320 B1 * | 2/2014 | Merrick | .................. H04L 69/18 |
| | | | 709/230 |
| 10,305,985 B1 * | 5/2019 | Ma | ..................... G06F 16/24578 |

(Continued)

FOREIGN PATENT DOCUMENTS

| CN | 1333625 A | 1/2002 |
| CN | 1195372 C | 3/2005 |

(Continued)

OTHER PUBLICATIONS

"3rd Generation Partnership Project; Technical Specification Group Services and System Aspects; System Architecture for the 5G System; Stage 2 (Release 15)", 3GPP TS 23.501 V15.0.0 Dec. 22, 2017, 181 pages.

(Continued)

*Primary Examiner* — Liang Che A Wang
(74) *Attorney, Agent, or Firm* — Cooper Legal Group, LLC

(57) ABSTRACT

Disclosed in the embodiments of the present application are a resource query method and apparatus, a device, and a storage medium. Said method comprises: a service user NF initiating a service access request to a service provider NF, the service access request carrying query conditions for a (Continued)

resource, the query conditions being used for indicating a combined query relationship of at least two query parameters; and the service user NF receiving a service access response returned by the service provider NF.

15 Claims, 3 Drawing Sheets

(58) Field of Classification Search
USPC .......................................... 709/225, 226, 229
See application file for complete search history.

(56) References Cited

U.S. PATENT DOCUMENTS

| | | | |
|---|---|---|---|
| 10,559,202 B2* | 2/2020 | Yang | G06V 10/82 |
| 2005/0138151 A1* | 6/2005 | Lam | G06F 9/44505 |
| | | | 709/220 |
| 2005/0198568 A1 | 9/2005 | Matsuzaki | |
| 2011/0099185 A1* | 4/2011 | Trevor | G06F 16/95 |
| | | | 707/E17.108 |
| 2011/0099194 A1* | 4/2011 | Trevor | G06F 8/31 |
| | | | 707/769 |
| 2012/0331010 A1* | 12/2012 | Christie | G06F 16/25 |
| | | | 707/802 |
| 2014/0012879 A1* | 1/2014 | Hamada | G06F 16/24553 |
| | | | 707/780 |
| 2014/0108474 A1* | 4/2014 | David | H04L 67/568 |
| | | | 707/827 |
| 2018/0113681 A1* | 4/2018 | Zhu | G06F 8/20 |
| 2019/0174321 A1* | 6/2019 | Sun | H04W 16/02 |

FOREIGN PATENT DOCUMENTS

| | | |
|---|---|---|
| CN | 102456030 A | 5/2012 |
| CN | 102981841 A | 3/2013 |
| CN | 103178982 A | 6/2013 |
| CN | 103685207 A | 3/2014 |
| CN | 103685421 A | 3/2014 |
| CN | 104301812 A | 1/2015 |
| CN | 104735066 A | 6/2015 |
| CN | 105224633 A | 1/2016 |
| CN | 105376170 A | 3/2016 |
| CN | 105594219 A | 5/2016 |
| CN | 105787056 A | 7/2016 |
| CN | 105787065 A | 7/2016 |
| CN | 105993010 A | 10/2016 |
| CN | 106294365 A | 1/2017 |
| CN | 106533658 A | 3/2017 |
| CN | 106649483 A | 5/2017 |
| CN | 103685421 B | 6/2017 |
| CN | 106933648 A | 7/2017 |
| CN | 106933999 A | 7/2017 |
| CN | 107004238 A | 8/2017 |
| CN | 107122418 A | 9/2017 |
| CN | 107409126 A | 11/2017 |
| CN | 103685207 B | 1/2018 |
| CN | 107637043 A | 1/2018 |
| CN | 107644323 A | 1/2018 |
| CN | 107682361 A | 2/2018 |
| CN | 107704265 A | 2/2018 |
| CN | 107832622 A | 3/2018 |
| CN | 107872484 A | 4/2018 |
| CN | 107885741 A | 4/2018 |
| CN | 108173957 A | 6/2018 |
| CN | 108399176 A | 8/2018 |
| HK | 1182856 A | 12/2013 |
| TW | 201721573 A | 6/2017 |

OTHER PUBLICATIONS

"pCR 28.546 Add Stage 3 Definitions", Jun. 2018, "3GPP TSG SA WG5 (Telecom Management) Meeting #119Ad-Hoc, Stockholm (Sweden) Source: Nokia, S5-184235", section 5, 20 pgs.
"pCR28.532 Add Stage 3 Content for Fault Supervision", Aug. 2018, GPP TSG SA WG5 (Telecom Management) Meeting #120, Belgrade (Serbia), S5-185446, 61 pgs.
"Telecommunication Management; Charging Management", 3GPP TS 32.291, V0.5.0. , 3rd Generation Partnership Project; Technical Specification Group Services and System Aspects, Stage 3, Release 15, 59 pgs.
International Search Report in the international application No. PCT/CN2019/109189, dated Jan. 8, 2020, 2 pgs.
English translation of the Written Opinion of the International Search Authority in the international application No. PCT/CN2019/109189, dated Jan. 8, 2020, 3 pgs.
"Principles and Guidelines for Services Definition", Jul. 2018, ETSI TS 129 501 v15.0.1 Release 15, 5G System, Stage 3 , Retrieved from the Internet: URL: https://www.etsi.ora/deliver/etsi_ts/, 57 pgs.
"Query Parameter", Aug. 2018, 3GPP TSG CT WG4 Meeting #86, West Palm Beach, US, C4-186009, Source: Nokia, Nokia Shanghai Bell, Current version: 15.0.1, 3 pgs.
"Unified Data Repository Services:, Feb. 2018, 3GPP TS 29.504, V0.1.0, 3gpp: "3rd Generation Partnership Project; Technical Specification Group Core Network and Terminals; 5G System; Stage 3 (Release 15), 15 pgs.
"PCR TS 29.504 Adding the Query Service Operation Description", Feb. 2018, 3GPP TSGCT4 Meeting #83, C4-182040-C31811014, Montreal, Canada; Source: China Mobile, 7 pgs.
"Technical Realization of Service Based Architecture", Jul. 2018, ETSI TS 129 500 v15.0.0 Release 15, 5G System, Stage3, Retrieved from the Internet: URL: https://www.etsi.org/deliver/etsi_ts/, 29 pgs.
Supplementary European Search Report in the European application No. 19867112.5, dated Nov. 2, 2021, 11 pgs.
"http—Correct way to pass multiple values for same parameter name in GET request—Stack Overflow", Nov. 2016, XP055928888, Retrieved from the Internet: URL: https://web.archive.org/web/20161126094236/https://stackoverflow.com/questions/24059773/correct-way-to-passmultiple-values-for-same-parameter-name-in-get-request, 4 pgs.

* cited by examiner

RESOURCE QUERY METHOD AND APPARATUS, DEVICE, AND STORAGE MEDIUM

CROSS-REFERENCE TO RELATED APPLICATION

The present application is based on and claims priority to Chinese patent application No. 201811154753.2, which is filed on Sep. 30, 2018. The contents of the Chinese patent application are incorporated herein by reference in its entirety.

TECHNICAL FIELD

The embodiments of the disclosure relate to, but are not limited to, Next Generation Core/5th Generation (5G) Next Generation Core (NGC/5GC) technology, in particular to a resource query method and apparatus, device, and storage medium.

BACKGROUND

GET and DELETE methods of existing Hyper Text Transfer Protocol (HTTP) and any other methods that may use query parameters can carry multiple query parameters, but do not involve the combination relationship of these parameters. A client (user) merely carries several query parameters to a server through an HTTP request, and the relationships among these query parameters are predefined by an upper layer application. The upper layer application receives all query parameters and analyzes the combination relationship of parameters according to predefined rules.

The existing method for expressing HTTP query parameter has the following problems: 1) multiple combination relationships of parameters cannot be expressed at the same time; 2) the condition that the parameter indicates NOT cannot be supported; 3) setting priority for query parameter is not supported.

SUMMARY

In view of this, in order to solve at least one problem in the related art, the embodiments of the disclosure provide a resource query method and apparatus, device, and storage medium.

The technical solutions of the embodiments of the disclosure are implemented as follows:

The embodiments of the disclosure provide a resource query method. The method includes the following operations. A service consumer NF initiates a request for accessing service to a service provider NF. The request for accessing service carries query conditions for a resource. The query conditions are used to indicate a combined query relationship of at least two query parameters. The service consumer NF receives a response for accessing service returned by the service provider NF.

The embodiments of the disclosure further provide a resource query method. The method includes the following operations. A service provider NF receives a request for accessing service initiated by a service consumer NF. The request for accessing service carries query conditions for a resource. The query conditions are used to indicate a combined query relationship of at least two query parameters. The service provider NF returns a response for accessing service to the service consumer NF according to the query conditions and the type of the request for accessing service.

The embodiments of the disclosure further provide a resource query apparatus. The apparatus includes an initiating unit and a first receiving unit. The initiating unit is configured to initiate a request for accessing service to a service provider NF. The request for accessing service carries query conditions for a resource, and the query conditions are used to indicate a combined query relationship of at least two query parameters. The first receiving unit is configured to receive a response for accessing service returned by the service provider NF.

The embodiments of the disclosure further provide a resource query apparatus. The apparatus includes a second receiving unit and a returning unit. The second receiving unit is configured to receive a request for accessing service initiated by a service consumer NF. The request for accessing service carries query conditions for a resource. The query conditions are used for indicating a combined query relationship of at least two query parameters. The returning unit is configured to return a response for accessing service to the service consumer NF according to the query conditions and the type of the request for accessing service.

The embodiments of the disclosure further provide a service consumer NF, including a memory and a processor, the memory stores computer programs that can be executed on the processor, and when the processor executes the computer programs, the operations in the resource query method on the service consumer NF side are realized.

The embodiments of the disclosure further provide a service provider NF, including a memory and a processor, the memory stores computer programs that can be executed on the processor, and when the processor executes the computer programs, the operations in the resource query method on the service provider NF side are realized.

The embodiments of the disclosure further provide a computer-readable storage medium on which computer programs are stored, and when the computer programs are executed by a processor, the operations in the resource query method on the service consumer NF side are realized; or, when the computer programs are executed by the processor, the operations in the resource query method on the service provider NF side are realized.

In the embodiments of the disclosure, a service consumer NF initiates a request for accessing service to a service provider NF, the request for accessing service carries query conditions for a resource, the query conditions are used for indicating a combined query relationship of at least two query parameters; and the service consumer NF receives a response for accessing service returned by the service provider NF. As such, the problems that the request for accessing service in the existing HTTP cannot adapt to a scenario of the 5G network that there are multiple meeting conditions existed for multiple query parameters and that multiple condition expressions cannot be carried at the same time.

DETAILED DESCRIPTION

The following describes the method of acquiring data resources and the method of 5GC deleting data resources in NGC/5GC.

1) The method of acquiring data resources adopts the GET method of Hyper Text Transfer Protocol (HTTP): resource Uniform Resource Identifier (URI) or resource URI+query parameters.

Figure 1A:
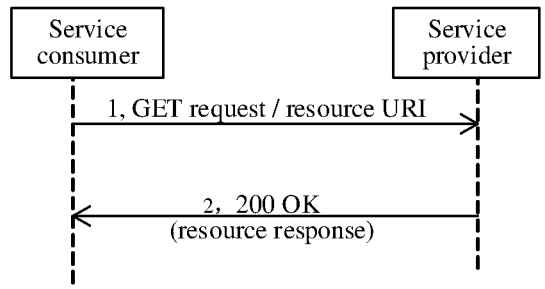
FIG. 1A is a first schematic diagram of the GET method in the related art.
Figure 1B:
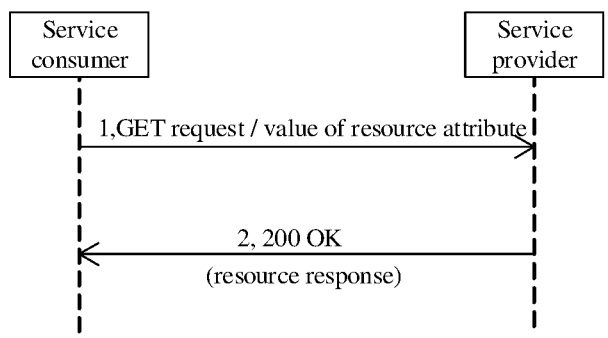
FIG. 1B is a second schematic diagram of a GET method in the related art.

Examples of the GET method are shown in FIG. 1A and FIG. 1B: Operation 1, a service consumer sends a GET request to a service provider to acquire resources; Operation 2, the service provider sends a 200 OK response to the service consumer.

In the examples of the GET method: 1) the resource URI that needs to be read is directly carried (see FIG. 1A); 2) an attribute in the resource that needs to be read is carried through a query parameter to acquire the corresponding resource (see FIG. 1B).

Figure 1C:
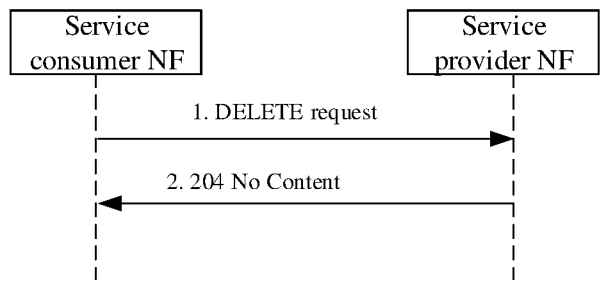
FIG. 1C is a schematic diagram of a DELETE method in the related art.

2) The method of 5GC deleting data resources adopts the DELETE method of HTTP, as shown in FIG. 1C: Operation 1, a service consumer Network Function (NF) sends a DELETE request to a service provider NF to delete resources; Operation 2, the service provider NF sends a 204 No Content response to the service consumer NF.

The above GET and DELETE methods can carry multiple query parameters, but do not involve the combination relationship of these parameters. The user merely carries several query parameters to a server through an HTTP request, and the relationships among these query parameters are predefined by an upper layer application. The upper layer application receives all query parameters and analyzes the combination relationship of parameters according to predefined rules.

There are multiple parameter combination query scenarios in 5GC: 1) service discovery scenario: relates to discovering Unified Data Management (UDM) based on User Equipment (UE) ID, NF type and Access type; discovering Policy Control function (PCF) and/or other parameters based on UE ID, NF type and Data Network Name (DNN); 2) downloading user data scenario: relates to NF ID, Subscription data type(s)/Key for each Subscription data type(s) and other parameters; 3) deleting session binding data scenario: relates to UE address1/2/3 . . . , DNN and other parameters.

The GET and DELETE methods of existing HTTP and any other methods that may use query parameters can carry multiple query parameters, but does not involve the combination relationship of these parameters. The client merely carries several query parameters to a server through an HTTP request, and the relationships among these query parameters are predefined by an upper layer application. The upper layer application receives all query parameters and analyzes the combination relationship of parameters according to predefined rules.

The query parameter representation method of existing HTTP has the following problems.

1) Multiple combination relationships of parameters cannot be expressed simultaneously: such as (parameter A=a) and (parameter B=b) and (parameter C=c), (parameter A=a) and (parameter B=b) or ( . . . ), (parameter A=a) or (parameter B=b) or 2) The condition that the parameter indicates NOT cannot be supported: (parameter A< >a) and (parameter B< >b) and . . . ; where < >means not equal to, that is, NOT.

3) Setting priority for query parameter is not supported: (Parameter A=a) or (parameter B=b) or ( . . . ) the condition of priority 1 (parameter A=a) is met must be selected, secondly the condition of priority 2 (parameter B=b) is met . . . .

Before introducing the technical solution of the embodiments, the following two aspects are introduced firstly.

1. The 5G core network adopts a service-oriented interface, and service calls are made between NFs based on the HTTP.

The 5G core network adopts a service-oriented architecture, and the interfaces among NFs adopt the service-oriented interfaces. It has been determined that HTTP/2+ Transmission Control Protocol (TCP) protocol is used for the 5G service-oriented interface.

The communication mechanism of service invocation, which is different from the message communication mechanism of Peer-to-peer (P2P), is adopted between NFs. Application Programming Interface (API) design style adopts Representational State Transfer (REST). If REST style cannot be used, Remote Procedure Call (RPC) style is considered. REST is resource-oriented and implemented using HTTP.

Designing 5G core network service interface API for each service needs to consider the definition of resources, resource URI, HTTP methods supported by given resources and general data types. (Resource, which is different from data, is a form of expression of data.) If a piece of data is required in different resources, it needs to be defined in the different resources.

Resources: divided into individual resources and structured resources (including sub-resource).

Operations on resources: CRUD, namely Create, Read, Update (Up), and Delete.

HTTP method: the processing that the client wants the server to perform on the resource, POST (register or submit, submit data to a specified resource for processing request)/PUT (upload, upload the latest content to a specified resource location); GET (get to make a request to a specific resource); PUT/PATCH (partial update, which is a supplement to the PUT method and is used to perform partial update on known resources); DELETE (delete, request the server to delete the resource identified by the requested URI).

2. 5G network data and resources involved in services related to data access.

The 5G network data includes contract data, service data, policy data, user context, identification, code number, etc. These data are stored in NFs, will be accessed through service calls, and will also be transmitted through the service-oriented interface. When data is transmitted through the service-oriented interface, it may be created, read, updated and deleted as a resource or a part of the resource. The operations/HTTP method for the resource when each service is called is related to the specific business process implemented by the service.

Registration: POST; cancellation: DELETE; download contract data: GET; query: GET . . . .

The following describes the HTTP request and HTTP response.

HTTP defines different methods for interacting with the server. There are four basic methods, namely GET, POST, PUT and DELETE. The full name of URL is Uniform Resource Locator. It may be considered that: a URL address, which is used to describe a resource on the network, and GET, POST, PUT and DELETE in HTTP correspond to the following four operations for the resource respectively: querying, modifying, adding, and deleting.

The HTTP response is similar to the HTTP request. The HTTP response is also composed of three parts: the status line, the response header and the response body. The status line is described by the protocol version, status code in a digital form and corresponding status description, and elements are separated by a space.

The common status codes are as follows:

200 OK, the client request is successful;

301 Moved Permanently, request permanent redirection;

403 Forbidden, the server receives the request, but refuses to provide service. The server usually gives the reason for not providing the service in the response body;

404 Not Found, the requested resource does not exist, for example, an incorrect URL was entered.

The technical solution of the disclosure will be further elaborated below in conjunction with the drawings and embodiments.

The embodiment proposes a resource query method, which is applicable to the service consumer NF, and the functions implemented by the method may be implemented by the processor in the service consumer NF calling program code, of course, the program codes can be stored in a computer storage medium. It can be seen that the service consumer NF includes at least a processor and a storage medium.

Figure 2A:
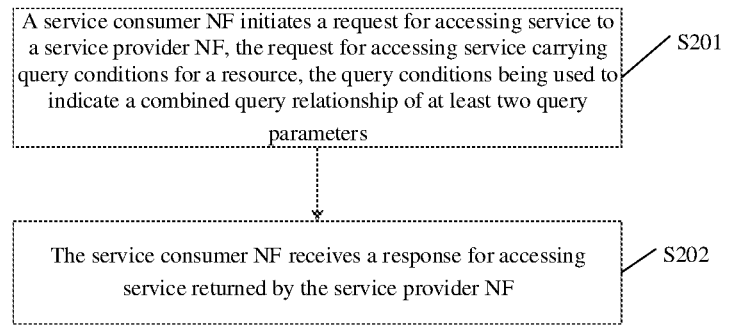
FIG. 2A is a schematic diagram of the implementation process of a resource query method according to the embodiments of the disclosure.

FIG. 2A is a schematic diagram of an implementation process of a resource query method according to the embodiments of the disclosure. As shown in FIG. 2A, the method includes the following operations.

Operation S201: a service consumer NF initiates a request for accessing service to a service provider NF, the request for accessing service carries query conditions of a resource, and the query conditions are used to indicate a combined query relationship of at least two query parameters.

Operation S202, the service consumer NF receives a response for accessing service returned by the service provider NF.

In some embodiments, the request for accessing service is an access request that has a resource query requirement, and types of the request for accessing service include at least a resource acquisition request and a resource deletion request.

In some embodiments, the query conditions of the resource are expressed in a JSON format, and/or when the HTTP is adopted, the query conditions of the resource are located in a request line of the request for accessing service.

In some embodiments, the combined query relationship includes a conditional expression formed by combining the at least two query parameters. Example 1: (Parameter A=a) and (Parameter B=b) and (Parameter C=c). Example 2: (Parameter A=a) and (Parameter B=b) or ( . . . ). Example 3: (Parameter A=a) or (parameter B=b) or ( . . . ). Example 1 is a combination of three query parameters A, B and C, and Examples 2 and 3 are formed at least by a combination of query parameters A and B. Among them, uppercase letters indicate query parameters, and lowercase letters indicate parameter values. In some embodiments, more generally, the one before the equal sign (=) or the non-equal sign is called the query parameter, and the one after the equal sign (=) or the non-equal sign is called the value of the query parameter. For example, X=Y, where X is a query parameter and Y is a value of the query parameter X.

In some embodiments, the conditional expression is used to indicate a logical relationship between multiple query parameters. The logical relationship includes at least "AND" (or "and"), and "OR" (or "or"). In the above Examples 1 to 3, the logical relationship between multiple query parameters is represented by "and" and/or "or", where "multiple" refers to two or three, four, etc., that is, at least two query parameters.

In some embodiments, the combined query relationship includes the priority of each query parameter for meeting a preset condition. A different priority or a same priority is defined for the preset condition met by each query parameter. The preset condition includes equal to or not, or, the combined query relationship includes the priorities of different combinations of query parameters, and different priorities are defined for different combinations of query parameters.

In some embodiments, the combined query relationship includes a combined conditional expression, or a conditional expression formed by nesting at least two conditional expressions. Among them, the conditional expression nesting multiple conditional expressions may be: (X=Y AND A=B) OR (X=Y AND C=D) OR (X=Y AND E=F), where the query parameters are: X=Y, A=B, C=D and E=F. There are 3 nested conditional expressions, namely: a nested conditional expression 1 is (X=Y AND A=B), a nested conditional expression 2 is (X=Y AND C=D) and a nested conditional expression 3 is (X=Y AND E=F).

In some embodiments, the nested at least two conditional expressions have different priorities or the same priority.

In some embodiments, the method further includes: in a conditional expression, in response to that a query parameter that meet a same preset condition repeatedly appear multiple times, the conditional expression is simplified in a dictionary manner, and the query parameter appeared repeatedly that meet the same preset condition is taken as an entry in a dictionary. Among them, multiple times refers to at least two occurrences, including two occurrences.

In the embodiments, a dictionary is set up firstly. For example, the "X=Y" may be identified as "1", and then the relevant repeated parts may be simplified in a dictionary manner. For example: before simplification: (X=Y AND A=B) OR (X=Y AND C=D) OR (X=Y AND E=F); after simplification: (1 AND A=B) OR (1 AND C=D) OR (1 AND E=F). That is, X=Y is simplified to 1.

In this example, the query parameters of a same preset condition (that is, X=Y) appears 3 times in the conditional expression before simplification, then the conditional expression may be simplified in the dictionary manner, and the "X=Y" appeared repeatedly is taken as an entry in the dictionary.

The embodiments propose a resource query method, which is applicable to the service provider NF, and the functions implemented by the method may be implemented by the processor in the service provider NF calling program code, of course, the program codes can be stored in a computer storage medium. It can be seen that the service consumer NF includes at least a processor and a storage medium.

Figure 2B:
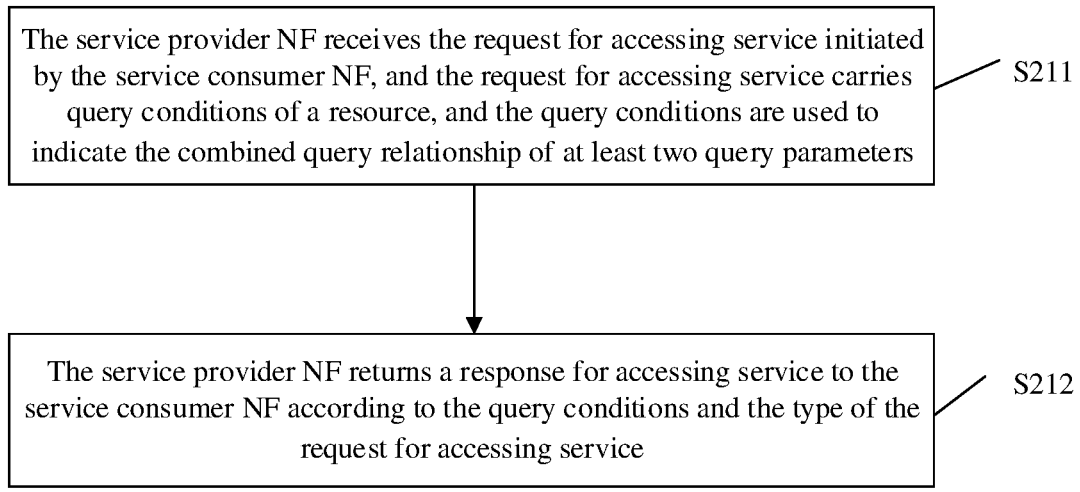
FIG. 2B is a schematic diagram of an implementation process of a resource query method according to the embodiments of the disclosure.

FIG. 2B is a schematic diagram of an implementation process of a resource query method according to the embodiments of the disclosure. As shown in FIG. 2B, the method includes the following operations.

Operation S211: the service provider NF receives the request for accessing service initiated by the service consumer NF, and the request for accessing service carries query conditions of a resource, and the query conditions are used to indicate the combined query relationship of at least two query parameters;

In some embodiments, the query conditions may also be used to indicate the combined query relationship and query priority of at least two query parameters.

Operation S212: the service provider NF returns a response for accessing service to the service consumer NF according to the query conditions and the type of the request for accessing service.

In some embodiments, the operation that the service provider NF returns a response for accessing service to the service consumer NF according to the query conditions and the type of the request for accessing service includes the following operations.

Operation S11, the service provider NF performs resource query according to the combined query relationship of the at least two query parameters.

In some embodiments, the service provider NF may also perform resource query according to the combined query relationship and query priority of at least two query parameters.

Here, when the service consumer NF performs a resource query, a resource query result will be obtained. In the implementation process, the query may be performed through the index, and the query result (which may be an index result) is used to represent whether a result meeting the combined query relationship (and query priority) is found. If the query result indicates that a resource is successfully found, the resource identifier (or resource index identifier) will be returned. If the query result indicates that the resource was not successfully found, then it will indicate that the resource is not successfully found.

Here, when performing resource query, there may be various manners. For example, when a service consumer creates a resource, a resource index identifier or an index relationship is generated for each resource. All the query conditions that may be used are mapped to the generated resource index identifier or index relationship. The mapping relationships among the query conditions and the resource index identifiers (or index relationships) may be one-to-one, one-to-multiple, multiple-to-one and multiple-to-multiple. The service consumer may match a resource index identifier or an index relationship according to resource query conditions and a mapping relationship (table), to find the resource.

Alternatively, the service consumer matches the corresponding resource sets according to each query parameter in the query conditions and the preset condition, and then the related resource sets are filtered according to the logical relationship of the query parameters to find the resource.

Operation S12: the service provider NF returns a response for accessing service to the service consumer NF according to the resource query result and the type of the request for accessing service.

Here, the types of request for accessing service include at least a resource acquisition request and a resource deletion request. If the request for accessing service is the resource acquisition request, the query result is carried in the response for accessing service. If the request for accessing service is the resource deletion request, the corresponding resource will be deleted according to the resource identifier in the query result, and then the result of whether the resource has been successfully deleted is included in the query response.

In some embodiments, the request for accessing service is an access request that has a resource query requirement, and types of the request for accessing service include at least a resource acquisition request and a resource deletion request.

In some embodiments, the query conditions of the resource are expressed in a JSON format, and/or when the HTTP is adopted, the query conditions of the resource are located in a request line of the request for accessing service.

In some embodiments, the combined query relationship includes a conditional expression formed by combining the at least two query parameters.

In some embodiments, the conditional expression is used to indicate logical relationships among multiple query parameters, and the logical relationships includes at least AND and OR.

In some embodiments, the combined query relationship includes the priority of each query parameter for meeting a preset condition, where a different priority or a same priority is defined for the preset condition met by each query parameter; where the preset condition includes equal to or not; or, the combined query relationship includes the priorities of different combinations of query parameters, and different priorities are defined for different combinations of query parameters.

In some embodiments, the combined query relationship includes a combined conditional expression, or a conditional expression formed by nesting at least two conditional expressions.

In some embodiments, the nested at least two conditional expressions have different priorities or the same priority.

In some embodiments, the method further includes: in a conditional expression, in response to that a query parameter that meet a same preset condition repeatedly appear multiple times, the conditional expression is simplified in a dictionary manner, and the query parameter appeared repeatedly that meet the same preset condition is taken as an entry in a dictionary.

In the embodiments, the query parameter expression method in the HTTP request line is extended to support using JSON to express the combined query conditions of multiple query parameters. Specifically, it may be a combined query condition expression of multiple query parameters. The condition expression may also include the priority of each query parameter for meeting the condition or the priority of each combined query condition.

The implemented solution includes the following operations.

When the service consumer NF initiates resource acquisition or resource deletion and any request for accessing service with resource query requirement to the service provider NF, it carries resource acquisition/delete and any query conditions required for resource query requirement. The query conditions describe the combined query relationship of multiple query parameters, and the combined query relationship is expressed in JSON format.

Among them, the query conditions may be in the following forms.

1) The query conditions may still be placed in the position of the query parameter of the resource URL in the HTTP request line.

2) The query conditions may be a combined query condition expression of multiple query parameters, or a condition expression nesting multiple combined query condition expressions.

3) The query conditions may include the priority of each query parameter for meeting the condition, and a different priority is defined for each query parameter met condition.

4) The query conditions can also include the priorities of different combinations of query parameters. Define priorities for different combinations of query parameters.

Embodiment 1 the query conditions are carried in the resource acquisition request for accessing service, for example, implemented by the GET method of HTTP.

Figure 3:
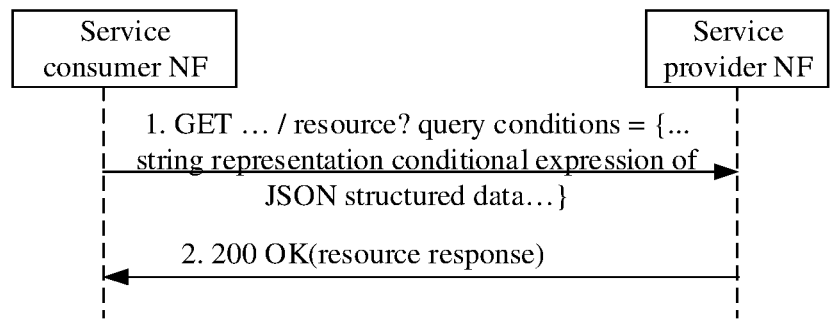
FIG. 3 is a schematic diagram of an implementation process of a resource acquisition method according to the embodiments of the disclosure.

FIG. 3 is a schematic diagram of an implementation process of a resource acquisition method according to the embodiments of the disclosure. As shown in FIG. 3, the method includes the following operations.

Operation 1, the service consumer NF (i.e., NF service consumer) sends a GET request to the service provider NF (i.e., NF service producer).

The GET request always carries query conditions to acquire resource, where the query conditions={ . . . string representation conditional expression of JSON structured data};

Operation 2, the service consumer NF returns a 200 OK response to the service provider NF, and a resource representation is carried in the 200 OK response.

Embodiment 2 the query conditions are carried in the resource deletion request for accessing service, for example, implemented by the DELETE method of HTTP.

Figure 4:
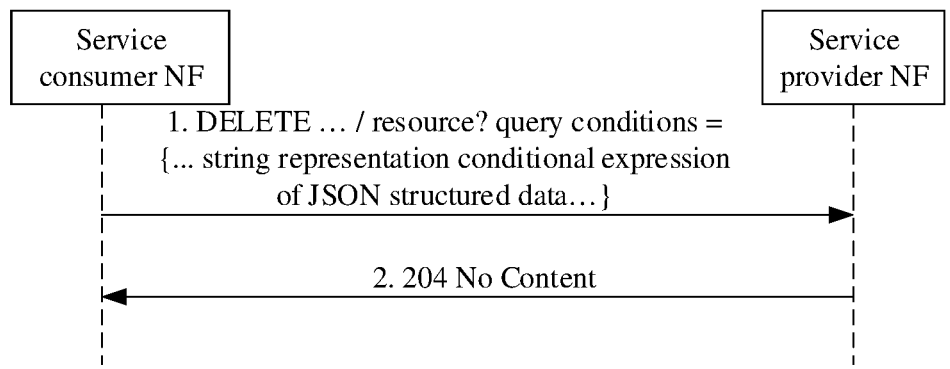
FIG. 4 is a schematic diagram of an implementation process of a resource deletion method according to the embodiments of the disclosure.

FIG. 4 is a schematic diagram of an implementation process of a resource deletion method according to the embodiments of the disclosure. As shown in FIG. 4, the method includes the following operations.

Operation 1, the service consumer NF sends a DELETE request to the service provider NF.

The DELETE request carries query conditions to delete resource, where the query conditions={ . . . string representation conditional expression of JSON structured data};

Operation 2, the service consumer NF returns a 200 No Content response to the service provider NF.

Embodiment 3 the query conditions may be a combined query condition expression of multiple query parameters.

For query conditions: A=a AND B=b AND C=c, where = means equal to.

```
{
    "cnfUnits":[
        {"cnfUnit":[{"key":"A","value":"a"}]},
        {"cnfUnit":[{"key":"B","value":"b"}]},
        {"cnfUnit":[{"key":"C","value":"c"}]}
    ]
}
```

Embodiment 4 the query conditions may be a condition expression nesting multiple combined query condition expressions.

For query conditions: (A=a AND B=b) OR (C=c AND D=d).

```
{
    "dnfUnits":[
        {"dnfUnit":[{"key":"A","value":"a"},{"key":"B","value":"b"}]},
        {"dnfUnit":[{"key":"C","value":"c"},{"key":"D","value":"d"}]},
    ]
}
```

Embodiment 5 the query conditions may include the priority of each query parameter for meeting the condition, and a different priority is defined for each query parameter met condition.

For query conditions: A=a OR B=b OR C=c, where priority is A>B>C.

```
{
    "dnfUnits":[
        {"dnfUnit":[{"key":"A","value":"a","priority":"1"}]},
        {"dnfUnit":[{"key":"B","value":"b","priority":"2"}]},
        {"dnfUnit":[{"key":"C","value":"c","priority":"3"}]}
    ]
}
```

Embodiment 6 when the query conditions are a condition expression nesting multiple combined query condition expressions, a different priority is defined for each nested combined query condition expression.

For query conditions: (A=a AND B=b) OR (C=c AND D=d), where the priority (A=a AND B=b)>(C=c AND D=d).

```
{
    "dnfUnits":[
        {"dnfUnit":[{"key":"A","value":"a"},{"key":"B","value":"b"}],
        "priority":"1"},
        {"dnfUnit":[{"key":"C","value":"c"},{"key":"D","value":"d"}],
        "priority":"2"},
    ]
}
```

In the above embodiments, when the service consumer NF initiates resource acquisition or resource deletion and any request for accessing service with resource query requirement to the service provider NF, the query conditions required for resource acquisition is carried. The query conditions describe the combined query relationship of multiple query parameters, and the combined query relationship is expressed in JSON format. The query conditions may be a combined query condition expression of multiple query parameters, or a condition expression nesting multiple combined query condition expressions. The query conditions may include the priority of each query parameter for meeting the condition, and a different priority is defined for each query parameter met condition. The priorities of different combinations of query parameters may also be included. Priorities for different combinations of query parameters are defined.

Compared with the prior art, the embodiments have the following technical advantages. 1) It solves the problems that the GET method in the existing HTTP cannot adapt to a scenario of the 5G network that there are multiple meeting conditions existed for multiple query parameters, and that multiple conditional expressions cannot be carried at the same time. 2) The expansion of conditional expression is realized by defining JSON strings, without modifying the conditional expression model of query parameters, making the expansion of query conditions more flexible. 3) The service consumer NF uses conditional expression to describe multiple different query conditions combinations of multiple query parameters, and brings the request for accessing service to the service provider NF through the service-oriented interface. It is not necessary for the service consumer NF and the service provider NF to define in advance the understanding of different query conditions combinations of query parameters in different scenarios in the upper layer application, which is beneficial to subsequent expansion.

Based on the foregoing embodiments, the embodiments of the disclosure provide a resource query apparatus, the units included in the apparatus and the modules included in the units may be implemented by a processor in the service consumer NF. And of course, they may also be implemented by specific logic circuits. In the implementation process, the processor may be a Central Processing Unit (CPU), a microprocessor (MPU), a Digital Signal Processor (DSP) or a Field Programmable Gate Array (FPGA), etc.

Figure 5A:
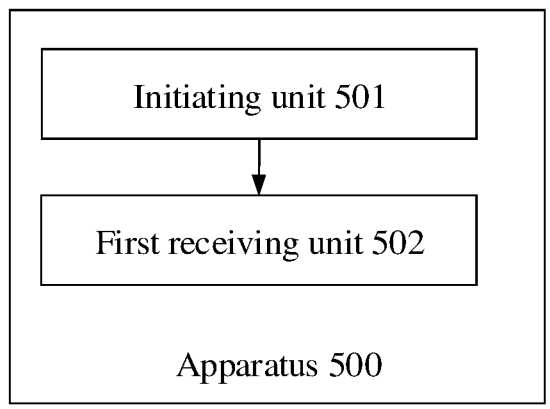
FIG. 5A is a schematic diagram of a composition structure of a resource query apparatus according to the embodiments of the disclosure.

FIG. 5A is a schematic diagram of the composition structure of a resource query apparatus according to the embodiments of the disclosure. As shown in FIG. 5A, the apparatus 500 includes the following units.

An initiating unit 501, which is configured to initiate a request for accessing service to the service provider NF, and the request for accessing service carries query conditions of a resource, and the query conditions are used to indicate the combined query relationship of at least two query parameters.

A first receiving unit 502, configured to receive the response for accessing service returned by the service provider NF.

In some embodiments, the request for accessing service is an access request that has a resource query requirement, and types of the request for accessing service include at least a resource acquisition request and a resource deletion request.

In some embodiments, the query conditions of the resource are expressed in a JSON format, and/or when the HTTP is adopted, the query conditions of the resource are located in a request line of the request for accessing service.

In some embodiments, the combined query relationship includes a conditional expression formed by combining the at least two query parameters.

In some embodiments, the conditional expression is used to indicate logical relationships among multiple query parameters, and the logical relationships include at least AND and OR.

In some embodiments, the combined query relationship includes the priority of each query parameter for meeting a preset condition, where a different priority or a same priority is defined for the preset condition met by each query parameter; where the preset condition includes equal to or not; or, the combined query relationship includes the priorities of different combinations of query parameters, and different priorities are defined for different combinations of query parameters.

In some embodiments, the combined query relationship includes a combined conditional expression, or a conditional expression formed by nesting at least two conditional expressions.

In some embodiments, the nested at least two conditional expressions have different priorities or the same priority.

In some embodiments, the method further includes: in a conditional expression, in response to that a query parameter that meet a same preset condition repeatedly appear multiple times, the conditional expression is simplified in a dictionary manner, and the query parameter appeared repeatedly that meet the same preset condition is taken as an entry in a dictionary.

Based on the foregoing embodiments, the embodiments of the disclosure provide a resource query apparatus, the units included in the apparatus and the modules included in the units may be implemented by a processor in the service provider NF. And of course, they may also be implemented by specific logic circuits. In the implementation process, the processor may be a Central Processing Unit (CPU), a microprocessor (MPU), a Digital Signal Processor (DSP) or a Field Programmable Gate Array (FPGA), etc.

Figure 5B:
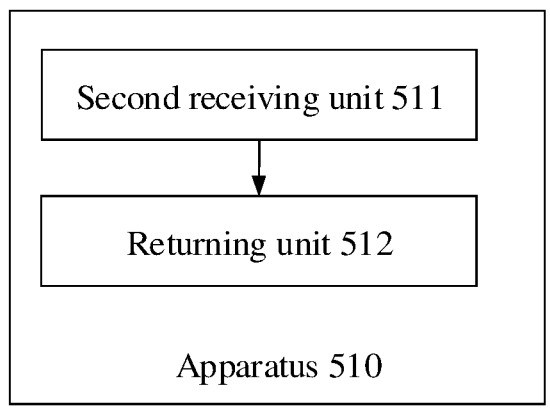
FIG. 5B is a schematic diagram of a composition structure of a resource query apparatus according to the embodiments of the disclosure.

FIG. 5B is a schematic diagram of the composition structure of a resource query apparatus according to the embodiments of the disclosure. As shown in FIG. 5B, the apparatus 510 includes the following units.

A second receiving unit 511, which is configured to receive a request for accessing service initiated by the service consumer NF, and the request for accessing service carries query conditions of a resource, and the query conditions are used to indicate the combined query relationship of at least two query parameters.

A returning unit 512, which is configured to return a response for accessing service to the service consumer NF according to the query conditions and the type of the request for accessing service.

In some embodiments, the returning unit includes the following modules.

An index module, which is configured to perform resource query according to the combined query relationship of the at least two query parameters;

A returning module, which is configured to return a response for accessing service to the service consumer NF according to the resource query result and the type of the request for accessing service.

In some embodiments, the request for accessing service is an access request that has a resource query requirement, and types of the request for accessing service include at least a resource acquisition request and a resource deletion request.

In some embodiments, the query conditions of the resource are expressed in a JSON format, and/or when the HTTP is adopted, the query conditions of the resource are located in a request line of the request for accessing service.

In some embodiments, the combined query relationship includes a conditional expression formed by combining the at least two query parameters.

In some embodiments, the conditional expression is used to indicate logical relationships among multiple query parameters, and the logical relationships include at least AND and OR.

In some embodiments, the combined query relationship includes the priority of each query parameter for meeting a preset condition, where a different priority or a same priority is defined for the preset condition met by each query parameter; where the preset condition includes equal to or not; or, the combined query relationship includes the priorities of different combinations of query parameters, and different priorities are defined for different combinations of query parameters.

In some embodiments, the combined query relationship includes a combined conditional expression, or a conditional expression formed by nesting at least two conditional expressions.

In some embodiments, the nested at least two conditional expressions have different priorities or the same priority.

In some embodiments, the method further includes: in a conditional expression, in response to that a query parameter that meet a same preset condition repeatedly appear multiple times, the conditional expression is simplified in a dictionary manner, and the query parameter appeared repeatedly that meet the same preset condition is taken as an entry in a dictionary.

The description of the above apparatus embodiments are similar to the description of the above method embodiments, and have similar beneficial effects as the method embodiments. For technical details not disclosed in the apparatus embodiments of the disclosure, please refer to the description of the method embodiments of the disclosure for understanding.

It should be noted that, in the embodiments of the disclosure, if the above resource query method is implemented in the form of software function modules and is sold or used as an independent product, it can also be stored in a computer readable storage medium. Based on this understanding, the technical solutions of the embodiments of the disclosure may be embodied in the form of a software product in essence or a part that contributes to related art. The computer software product is stored in a storage medium, and includes a number of instructions to enable the service consumer NF or the service provider NF to execute all or part of the method described in each embodiment of the disclosure. The aforementioned storage medium includes: a U disk, a mobile hard disk, a Read Only Memory (ROM), a magnetic disk or an optical disk and other medium that can store program codes. In this way, the embodiments of the disclosure are not limited to any specific hardware and software combination.

Correspondingly, the embodiments of the disclosure provide a service consumer NF, including a memory and a processor, the memory stores computer programs that can be executed on the processor, and when the processor executes the programs, the operations in the resource query method on the service consumer NF side are realized.

The embodiments of the disclosure further provide a service provider NF, including a memory and a processor, the memory stores computer programs that can be executed on the processor, and when the processor executes the programs, the operations in the resource query method on the service provider NF side are realized.

The embodiments of the disclosure further provide a computer-readable storage medium on which computer programs are stored, and when the computer programs are executed by a processor, the operations in the resource query method on the service consumer NF side are realized; or, when the computer programs are executed by the processor, the operations in the resource query method on the service provider NF side are realized.

What needs to be pointed out here is: the above description of the storage medium and device embodiments are similar to the description of the above method embodiments, and have similar beneficial effects as the method embodiments. For technical details not disclosed in the storage medium and device embodiments of the disclosure, please refer to the description of the method embodiments of the disclosure for understanding.

Figure 6:
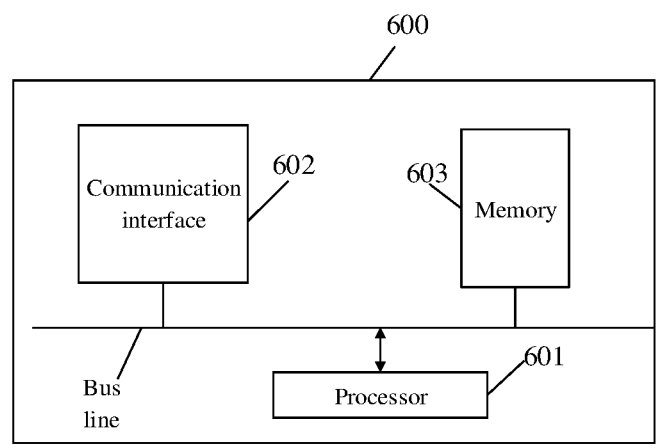
FIG. 6 is a schematic diagram of a hardware entity of a service access device in the embodiments of the disclosure.

It should be noted that FIG. 6 is a schematic diagram of a hardware entity of a service access device (including the service consumer NF or the service provider NF) in the embodiments of the disclosure. As shown in FIG. 6, the hardware entity of the service access device 600 includes: a processor 601, a communication interface 602 and a memory 603.

The processor 601 generally controls the overall operations of the service access device NF 600.

The communication interface 602 may enable the service access device to communicate with other terminals or servers through a network.

The memory 603 is configured to store instructions and applications executable by the processor 601, and may also cache data (for example, image data, audio data, voice communication data and video communication data) to be processed or processed by each module in the processor 601 and the service access device 600, which may be implemented by a flash memory or a Random Access Memory (RAM).

It should be understood that "one embodiment" or "an embodiment" mentioned throughout the specification means that specific features, structures, or characteristics related to the embodiment is included in at least one embodiment of the disclosure. Therefore, the appearances of "in one embodiment" or "in an embodiment" in various places throughout the specification do not necessarily refer to the same embodiment. In addition, these specific features, structures, or characteristics can be combined in one or more embodiments in any suitable manner. It should be understood that, in the various embodiments of the disclosure, the size of the serial number of the above-mentioned processes does not mean the order of execution, and the execution order of each process should be determined by its function and internal logic, and should not constitute any limitation to the implementation process of the embodiments of the disclosure. The serial numbers of the foregoing embodiments of the disclosure are only for description, and do not represent the advantages and disadvantages of the embodiments.

It should be noted that in this article, the terms "comprise", "include" or any other variants thereof are intended to cover non-exclusive inclusion, so that a process, method, material or apparatus including a series of elements not only includes those elements, it also includes other elements not explicitly listed, or elements inherent to the process, method, material or apparatus. Without more restrictions, the element defined by the sentence "including a . . . " does not exclude the existence of other identical elements in the process, method, material or apparatus that includes the element.

In the several embodiments provided in the disclosure, it should be understood that the disclosed device and method may be implemented in other ways. The device embodiments described above are only illustrative. For example, the division of the units is only a logical function division, and there may be other divisions in actual implementation, such as: multiple units or components can be combined, or can be integrated into another system, or some features can be ignored or not implemented. In addition, the coupling, or direct coupling, or communication connection between the components shown or discussed may be indirect coupling or communication connection through some interfaces, devices or units, and may be electrical, mechanical or other forms.

The units described above as separate components may or may not be physically separate, and the components displayed as units may or may not be physical units; they may be located in one place or distributed on multiple network units; some or all of the units can be selected according to actual needs to achieve the purpose of the solution of the embodiments.

In addition, the functional units in the embodiments of the disclosure can be all integrated into one processing unit, or each unit can be individually used as a unit, or two or more units can be integrated into one unit; the unit can be implemented in the form of hardware, or in the form of hardware and software functional units.

A skilled person in the art can understand that all or part of the operations in the above method embodiments can be implemented by a program instructing relevant hardware. The foregoing program can be stored in a computer readable storage medium. When the program is executed, it executes the operations including the above method embodiments; and the foregoing storage medium includes: a removable storage device, a ROM, a magnetic disk or an optical disk and other medium that can store program codes.

Or, if the above-mentioned integrated unit of the disclosure is implemented in the form of a software function module and sold or used as an independent product, it can also be stored in a computer readable storage medium. Based on this understanding, the technical solutions of the embodiments of the disclosure can be embodied in the form of a software product in essence or a part that contributes to related art. The computer software product is stored in a storage medium, and includes a number of instructions to enable the service consumer NF or the service provider NF to execute all or part of the method described in each embodiment of the disclosure. The aforementioned storage medium includes: a removable storage device, a ROM, a magnetic disk or optical disk and other medium that can store program codes.

The above are only the implementation manners of the disclosure, but the protection scope of the disclosure is not limited to this. Any person skilled in the art can easily think of changes or substitutions within the technical scope disclosed in the disclosure, and they should be covered by the protection scope of the disclosure. Therefore, the protection scope of the disclosure should be subject to the protection scope of the claims.

The invention claimed is:

1. A resource query method, applicable to a service consumer Network Function (NF) in fifth Generation of Cellular technology networks (5G), comprising:
   initiating, by the service consumer NF, a request for accessing service to a service provider NF, wherein the request for accessing service is used to request the service provider NF to access a resource, the resource comprising at least one of 5G subscription data or 5G policy data, wherein the request for accessing service carries query conditions of the resource, the query conditions are used to indicate a combined query relationship of at least two query parameters, and the at least two query parameters are used to filter the resource; and
   receiving, by the service consumer NF, a response for accessing service, the response for accessing service being returned by the service provider NF according to the query conditions and the response for accessing service being a Hyper Text Transfer Protocol (HTTP) response,
   wherein the combined query relationship comprises a conditional expression formed by combining the at least two query parameters,
   wherein the combined query relationship comprises a conditional expression formed by nesting at least two conditional expressions, and the at least two conditional expressions are concatenated by logical operations,
   wherein the method further comprises:
      in response to a query parameter that meets a same preset condition repeatedly appearing multiple times in a conditional expression, simplifying the conditional expression in a dictionary manner, and taking the query parameter appearing repeatedly that meets the same preset condition as an entry in a dictionary.

2. The method of claim 1, wherein the request for accessing service is a request including a resource query requirement, and types of the request for accessing service comprise at least a resource acquisition request and a resource deletion request.

3. The method of claim 1, wherein the method comprises at least one of the following:
   the query conditions of the resource are expressed in a JavaScript Object Notation (JSON) format; or
   when HTTP is adopted, the query conditions of the resource are located in a request line of the request for accessing service.

4. The method of claim 1, wherein the conditional expression formed by combining the at least two query parameters is used to indicate a logical relationship among multiple query parameters, and the logical relationship comprises at least AND and OR.

5. The method of claim 1, wherein the combined query relationship comprises a priority of each query parameter for meeting a preset condition; and
   wherein a different priority or a same priority is defined for the preset condition met by each query parameter, and the preset condition comprises EQUAL TO or NOT; or the combined query relationship comprises priorities of different combinations of query parameters, and different priorities are defined for the different combinations of query parameters.

6. The method of claim 1, wherein the nested at least two conditional expressions have different priorities or a same priority.

7. A resource query method, applicable to a service provider Network Function (NF) in fifth Generation of Cellular technology networks (5G), comprising:
   receiving, by the service provider NF, a request for accessing service initiated by a service consumer NF, wherein the request for accessing service is used to request the service provider NF to access a resource, the resource comprising at least one of 5G subscription data or 5G policy data, wherein the request for accessing service carries query conditions of the resource, the query conditions are used to indicate a combined query relationship of at least two query parameters, and the at least two query parameters are used to filter the resource; and
   returning, by the service provider NF, a response for accessing service to the service consumer NF according to the query conditions and types of the request for accessing service, the response for accessing service being a Hyper Text Transfer Protocol (HTTP) response,
   wherein the combined query relationship comprises a conditional expression formed by combining the at least two query parameters,
   wherein the combined query relationship comprises a conditional expression formed by nesting at least two conditional expressions, and the at least two conditional expressions are concatenated by logical operations, wherein the method further comprises:
in response to a query parameter that meets a same preset condition repeatedly appearing multiple times in a conditional expression, simplifying the conditional expression in a dictionary manner, and taking the query parameter appearing repeatedly that meets the same preset condition as an entry in a dictionary.

8. The method of claim 7, wherein returning, by the service provider NF, the response for accessing service to the service consumer NF according to the query conditions and the types of the request for accessing service comprises:
performing, by the service provider NF, resource query according to the combined query relationship of the at least two query parameters; and
returning, by the service provider NF, the response for accessing service to the service consumer NF according to a resource query result and the types of the request for accessing service.

9. A service consumer Network Function (NF) in fifth Generation of Cellular technology networks (5G), comprising:
a memory; and
a processor,
wherein the memory stores computer programs that are configured to be executed on the processor, and when the computer programs are executed by the processor, the processor is configured to:
initiate a request for accessing service to a service provider NF, wherein the request for accessing service is used to request the service provider NF to access a resource, the resource comprising at least one of 5G subscription data or 5G policy data, wherein the request for accessing service carries query conditions of the resource, the query conditions are used to indicate a combined query relationship of at least two query parameters, and the at least two query parameters are used to filter the resource; and
receive a response for accessing service, the response for accessing service being returned by the service provider NF according to the query conditions and the response for accessing service being a Hyper Text Transfer Protocol (HTTP) response,
wherein the combined query relationship comprises a conditional expression formed by combining the at least two query parameters,
wherein the combined query relationship comprises a conditional expression formed by nesting at least two conditional expressions, and the at least two conditional expressions are concatenated by logical operations,
wherein the processor is further configured to:
in response to a query parameter that meets a same preset condition repeatedly appearing multiple times in a conditional expression, simplify the conditional expression in a dictionary manner, and take the query parameter appearing repeatedly that meets the same preset condition as an entry in a dictionary.

10. The service consumer NF of claim 9, wherein the request for accessing service is an access request including a resource query requirement, and types of the request for accessing service comprise at least a resource acquisition request and a resource deletion request.

11. The service consumer NF of claim 9, wherein the query conditions of the resource comprise at least one of the following:

the query conditions of the resource that are expressed in a JavaScript Object Notation (JSON) format; or
when HTTP is adopted, the query conditions of the resource that are located in a request line of the request for accessing service.

12. The service consumer NF of claim 9, wherein the conditional expression formed by combining the at least two query parameters is used to indicate a logical relationship among multiple query parameters, and the logical relationship comprises at least AND and OR.

13. The service consumer NF of claim 9, wherein the combined query relationship comprises a priority of each query parameter for meeting a preset condition; and
wherein a different priority or a same priority is defined for the preset condition met by each query parameter, and the preset condition comprises EQUAL TO or NOT; or the combined query relationship comprises priorities of different combinations of query parameters, and different priorities are defined for the different combinations of query parameters.

14. A service provider Network Function (NF) in fifth Generation of Cellular technology networks (5G), comprising:
a memory; and
a processor,
wherein the memory stores computer programs that are configured to be executed on the processor, and when the computer programs are executed by the processor, the processor is configured to:
receive a request for accessing service initiated by a service consumer NF, wherein the request for accessing service is used to request the service provider NF to access a resource, the resource comprising at least one of 5G subscription data or 5G policy data, wherein the request for accessing service carries query conditions of the resource, the query conditions are used to indicate a combined query relationship of at least two query parameters, and the at least two query parameters are used to filter the resource; and
return a response for accessing service to the service consumer NF according to the query conditions and types of the request for accessing service, the response for accessing service being a Hyper Text Transfer Protocol (HTTP) response,
wherein the combined query relationship comprises a conditional expression formed by combining the at least two query parameters,
wherein the combined query relationship comprises a conditional expression formed by nesting at least two conditional expressions, and the at least two conditional expressions are concatenated by logical operations,
wherein the processor is further configured to:
in response to a query parameter that meets a same preset condition repeatedly appearing multiple times in a conditional expression, simplify the conditional expression in a dictionary manner, and take the query parameter appearing repeatedly that meets the same preset condition as an entry in a dictionary.

15. The service provider NF of claim 14, wherein the processor is specifically configured to:
   perform resource query according to the combined query relationship of the at least two query parameters; and
   return the response for accessing service to the service consumer NF according to a resource query result and the types of the request for accessing service.

* * * * *